United States Patent
Wu et al.

(10) Patent No.: US 12,439,266 B2
(45) Date of Patent: Oct. 7, 2025

(54) WIRELESS COMMUNICATION METHOD FOR UNLICENSED FREQUENCY SPECTRUM, AND COMMUNICATION DEVICE

(71) Applicant: BEIJING OPPO TELECOMMUNICATIONS CORP., LTD., Beijing (CN)

(72) Inventors: Zuomin Wu, Beijing (CN); Chuanfeng He, Beijing (CN)

(73) Assignee: BEIJING OPPO TELECOMMUNICATIONS CORP., LTD., Beijing (CN)

( * ) Notice: Subject to any disclaimer, the term of this patent is extended or adjusted under 35 U.S.C. 154(b) by 980 days.

(21) Appl. No.: 17/488,704

(22) Filed: Sep. 29, 2021

(65) Prior Publication Data

US 2022/0022051 A1    Jan. 20, 2022

Related U.S. Application Data

(63) Continuation of application No. PCT/CN2019/080550, filed on Mar. 29, 2019.

(51) Int. Cl.
*H04W 16/14*    (2009.01)
*H04W 74/0808*    (2024.01)

(52) U.S. Cl.
CPC ....... *H04W 16/14* (2013.01); *H04W 74/0808* (2013.01)

(58) Field of Classification Search
CPC ............. H04W 16/14; H04W 74/0808; H04W 74/006; H04W 74/002; H04W 74/0833;
(Continued)

(56) References Cited

U.S. PATENT DOCUMENTS

2018/0049060 A1* 2/2018 Fujishiro ............... H04W 72/30
2018/0332576 A1* 11/2018 Oh ........................ H04W 74/08
(Continued)

FOREIGN PATENT DOCUMENTS

| CN | 108464051 A | 8/2018 |
| WO | 2017185998 A1 | 11/2017 |

OTHER PUBLICATIONS

Wilus Inc., "Discussion on initial access and mobility for NR-U operation", 3GPP TSG RAN WG1 Meeting #94 R1-1809326 (Aug. 24, 2018).
(Continued)

*Primary Examiner* — Romani Ohri
(74) *Attorney, Agent, or Firm* — Sheppard, Mullin, Richter &Hampton LLP

(57) ABSTRACT

An embodiment of the present disclosure provides a wireless communication method and apparatus for unlicensed frequency spectrum, and a communication device. The method includes transmitting, by a first device, first information to a second device on a first transmission burst within first Channel Occupancy Time (COT). A channel access scheme corresponding to the first transmission burst is determined based on a second transmission burst. The second transmission burst is a last transmission burst before the first transmission burst within the first COT. The first COT is COT obtained by the first device or COT obtained by the second device.

15 Claims, 5 Drawing Sheets

(58) Field of Classification Search
CPC . H04W 74/08; H04W 74/04; H04W 74/0866; H04W 74/0816; H04W 74/085; H04W 74/004; H04W 72/1268; H04W 72/14; H04W 72/23; H04W 72/085; H04W 72/21; H04W 72/542; H04W 72/042; H04W 72/1289; H04W 72/02; H04W 72/0453; H04W 72/046; H04W 72/12; H04W 72/0466; H04W 72/0446; H04W 72/30; H04W 48/12; H04W 76/28; H04W 76/11; H04W 88/08; H04W 80/20; H04W 28/06; H04W 4/06; H04L 5/001; H04L 5/0053; H04L 5/0078; H04L 5/0094; H04L 5/0037; H04L 5/0092; H04L 5/0064; H04L 5/0082; H04L 5/0032; H04L 5/0044; H04L 5/0091; H04L 5/0023; H04L 5/0048; H04L 5/14; H04L 1/1812; H04L 1/08; H04L 1/188; H04L 1/0025; H04L 1/1819; H04L 1/1854; H04L 1/1861; H04L 1/1864; H04L 1/1896; H04L 27/26025; H04L 69/324; H04B 7/0639; H04B 7/0695; Y02D 30/70
See application file for complete search history.

(56) References Cited

U.S. PATENT DOCUMENTS

| | | | |
|---|---|---|---|
| 2019/0380064 A1* | 12/2019 | Salem | H04W 74/0808 |
| 2020/0100284 A1* | 3/2020 | Li | H04W 72/044 |
| 2020/0178297 A1* | 6/2020 | Park | H04W 74/0808 |
| 2020/0260486 A1* | 8/2020 | Zhou | H04W 28/0278 |
| 2020/0275484 A1* | 8/2020 | Xu | H04W 72/1268 |
| 2020/0280859 A1* | 9/2020 | Kim | H04W 16/14 |
| 2020/0280971 A1* | 9/2020 | Moon | H04L 5/0053 |
| 2020/0314889 A1* | 10/2020 | Cirik | H04W 72/23 |
| 2021/0243807 A1* | 8/2021 | Hooli | H04W 72/0453 |
| 2022/0086908 A1* | 3/2022 | Myung | H04W 74/0816 |
| 2022/0095375 A1* | 3/2022 | Oh | H04W 74/006 |
| 2022/0141872 A1* | 5/2022 | Wang | H04W 74/0816 370/329 |
| 2022/0191966 A1* | 6/2022 | Wang | H04W 76/28 |

OTHER PUBLICATIONS

International Search Report and Written Opinion date Dec. 31, 2019 in International Application No. PCT/CN2019/080550. English translation attached.

\* cited by examiner

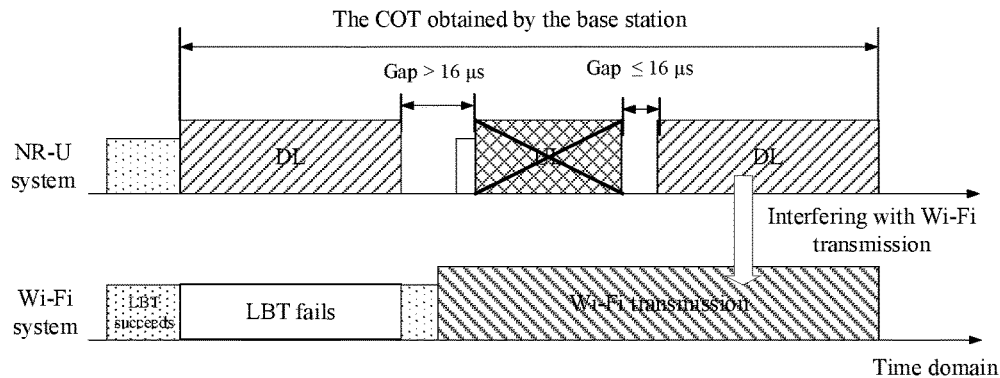

FIG. 3

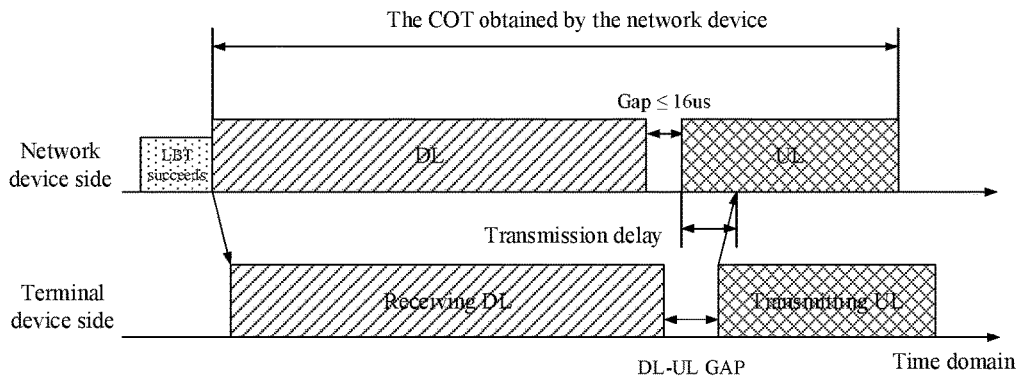

FIG. 4

Transmitting, by a first device, first information to a second device on a first transmission burst within first Channel Occupancy Time (COT), wherein a channel access scheme corresponding to the first transmission burst is determined based on a second transmission burst, the second transmission burst is a last transmission burst before the first transmission burst within the first COT, and the first COT is COT obtained by the first device or COT obtained by the second device

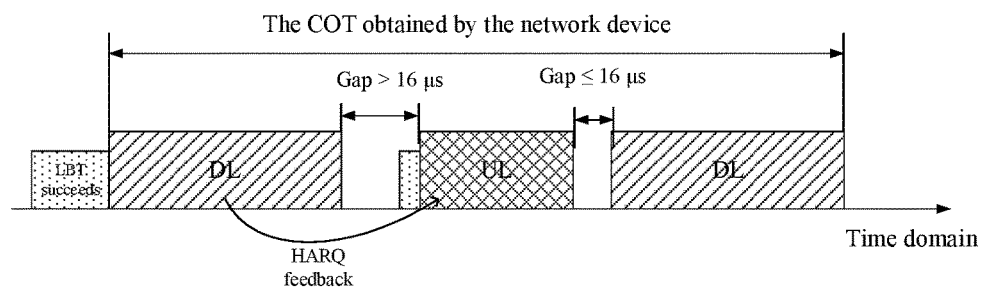

FIG. 6

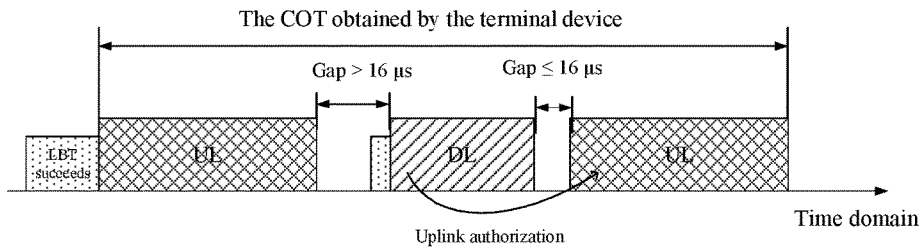

FIG. 7

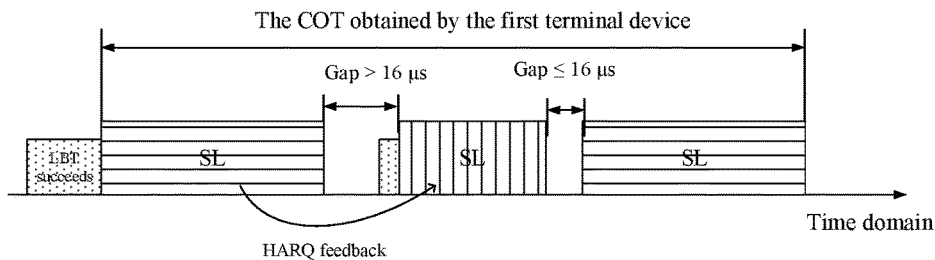

FIG. 8

Transmitting, by a terminal device, uplink information to a network device on a first transmission burst, wherein the first transmission burst is a transmission burst within first Channel Occupancy Time (COT) obtained by the network device, a second transmission burst is a last transmission burst before the first transmission burst within the first COT, and a first time interval between end time of the second transmission burst and start time of the first transmission burst is shorter than or equal to a first threshold ⟵ 901

FIG. 9

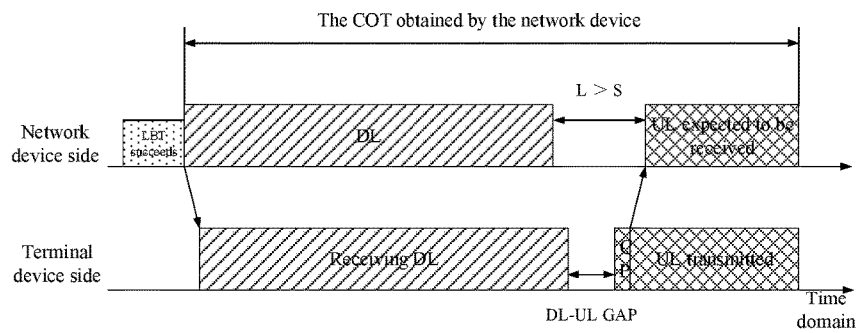

FIG. 10

Transmitting, by a network device, downlink information to a terminal device on a first transmission burst, wherein the first transmission burst is a transmission burst within first Channel Occupancy Time (COT) obtained by the terminal device, a second transmission burst is a last transmission burst before the first transmission burst within the first COT, and a first time interval between end time of the second transmission burst and start time of the first transmission burst is shorter than or equal to a first threshold ⟵ 1101

FIG. 11

WIRELESS COMMUNICATION METHOD FOR UNLICENSED FREQUENCY SPECTRUM, AND COMMUNICATION DEVICE

CROSS-REFERENCE TO RELATED APPLICATION

The present application is a continuation of International Application No. PCT/CN2019/080550, filed on Mar. 29, 2019, which is incorporated herein by reference in its entirety.

TECHNICAL FIELD

Embodiments of the present disclosure relate to a field of wireless communication technologies, and more particularly, to a wireless communication method and apparatus for an unlicensed frequency spectrum, and a communication device.

BACKGROUND

An unlicensed frequency spectrum is a spectrum allocated by countries and regions for radio device communication. The spectrum is generally considered to be a shared spectrum. That is, communication devices in different communication systems can use the spectrum as long as they meet regulatory requirements set by a corresponding country or region on the spectrum, without applying for proprietary spectrum authorization from the government.

Regarding the unlicensed frequency spectrum, channel access schemes applied in different transmission scenarios are specified in the related art. The channel access schemes specified in the related art may cause severe interference on an unlicensed carrier when transmitting a certain transmission burst.

SUMMARY

An embodiment of the present disclosure provides a wireless communication method and apparatus for an unlicensed frequency spectrum, and a communication device.

The wireless communication method for an unlicensed frequency spectrum according to an embodiment of the present disclosure includes the following.

In a first aspect, an embodiment of the present disclosure provides a wireless communication method for an unlicensed frequency spectrum. The method includes transmitting, by a first device, first information to a second device on a first transmission burst within first Channel Occupancy Time (COT). A channel access scheme corresponding to the first transmission burst is determined based on a second transmission burst. The second transmission burst is a last transmission burst before the first transmission burst within the first COT. The first COT is COT obtained by the first device or COT obtained by the second device.

In a second aspect, an embodiment of the present disclosure provides a wireless communication method for an unlicensed frequency spectrum. The method includes transmitting, by a terminal device, uplink information to a network device on a first transmission burst. The first transmission burst is a transmission burst within first Channel Occupancy Time (COT) obtained by the network device. A second transmission burst is a last transmission burst before the first transmission burst within the first COT. A first time interval between end time of the second transmission burst and start time of the first transmission burst is shorter than or equal to a first threshold.

In a third aspect, an embodiment of the present disclosure provides a wireless communication method for an unlicensed frequency spectrum. The method includes transmitting, by a network device, downlink information to a terminal device on a first transmission burst. The first transmission burst is a transmission burst within first Channel Occupancy Time (COT) obtained by the terminal device. A second transmission burst is a last transmission burst before the first transmission burst within the first COT. A first time interval between end time of the second transmission burst and start time of the first transmission burst is shorter than or equal to a first threshold.

In a fourth aspect, an embodiment of the present disclosure provides a wireless communication apparatus for an unlicensed frequency spectrum. The apparatus is applied in a first device. The apparatus includes a transmitting unit configured to transmit first information to a second device on a first transmission burst within first Channel Occupancy Time (COT). A channel access scheme corresponding to the first transmission burst is determined based on a second transmission burst. The second transmission burst is a last transmission burst before the first transmission burst within the first COT. The first COT is COT obtained by the first device or COT obtained by the second device.

In a fifth aspect, an embodiment of the present disclosure provides a wireless communication apparatus for an unlicensed frequency spectrum. The apparatus is applied in a terminal device. The apparatus includes a communication unit configured to transmit uplink information to a network device on a first transmission burst. The first transmission burst is a transmission burst within first Channel Occupancy Time (COT) obtained by the network device. A second transmission burst is a last transmission burst before the first transmission burst within the first COT. A first time interval between end time of the second transmission burst and start time of the first transmission burst is shorter than or equal to a first threshold.

In a sixth aspect, an embodiment of the present disclosure provides a wireless communication apparatus for an unlicensed frequency spectrum. The apparatus is applied in a network device. The apparatus includes a communication unit configured to transmit downlink information to a terminal device on a first transmission burst. The first transmission burst is a transmission burst within first Channel Occupancy Time (COT) obtained by the terminal device. A second transmission burst is a last transmission burst before the first transmission burst within the first COT. A first time interval between end time of the second transmission burst and start time of the first transmission burst is shorter than or equal to a first threshold.

In a seventh aspect, an embodiment of the present disclosure provides a communication device. The communication device includes a processor and a memory. The memory is configured to store a computer program. The processor is configured to invoke and run the computer program stored in the memory to perform the wireless communication method for an unlicensed frequency spectrum as described above.

In an eighth aspect, an embodiment of the present disclosure provides a chip. The chip is configured to perform the wireless communication method for an unlicensed frequency spectrum as described above.

Specifically, the chip includes a processor. The processor is configured to invoke and run a computer program from a memory. An apparatus provided with the chip is operative to perform the wireless communication method for an unlicensed frequency spectrum as described above.

In a ninth aspect, an embodiment of the present disclosure provides a computer-readable storage medium having a computer program stored thereon. The computer program causes a computer to perform the wireless communication method for an unlicensed frequency spectrum as described above.

In a tenth aspect, an embodiment of the present disclosure provides a computer program product. The computer program product includes computer program instructions. The computer program instructions cause a computer to perform the wireless communication method for an unlicensed frequency spectrum as described above.

In an eleventh aspect, an embodiment of the present disclosure provides a computer program. The computer program, when running on a computer, causes a computer to perform the wireless communication method for an unlicensed frequency spectrum as described above.

With the above technical solution, the channel access scheme corresponding to the first transmission burst is determined based on the second transmission burst. In this way, channel sharing can be realized, and channel access opportunities can be increased. Also, interference to other transmissions on an unlicensed frequency spectrum, such as transmissions of different systems, can be avoided.

BRIEF DESCRIPTION OF DRAWINGS

The accompanying drawings described here are used to provide a further understanding of the present disclosure and constitute a part of the present disclosure. Exemplary embodiments of the present disclosure and description thereof are used to explain the present disclosure, and do not constitute an improper limitation of the present disclosure. In the accompanying drawings:

FIG. 3 is a schematic diagram showing a transmission burst corresponding to question 1 according to an embodiment of the present disclosure.

FIG. 4 is a schematic diagram showing a transmission burst corresponding to question 2 according to an embodiment of the present disclosure.

FIG. 5 is a first flowchart illustrating a wireless communication method for an unlicensed frequency spectrum according to an embodiment of the present disclosure.

FIG. 6 is a schematic diagram showing a transmission burst of application example 1 according to an embodiment of the present disclosure.

FIG. 7 is a schematic diagram showing a transmission burst of application example 2 according to an embodiment of the present disclosure.

FIG. 8 is a schematic diagram showing a transmission burst of application example 3 according to an embodiment of the present disclosure.

FIG. 9 is a second flowchart illustrating a wireless communication method for an unlicensed frequency spectrum according to an embodiment of the present disclosure.

FIG. 10 is a schematic diagram of a transmission burst in a case of a conversion from downlink reception to uplink transmission according to an embodiment of the present disclosure.

FIG. 11 is a third flowchart illustrating a wireless communication method for an unlicensed frequency spectrum according to an embodiment of the present disclosure.

DESCRIPTION OF EMBODIMENTS

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced Long Term Evolution (LTE-A) system, a New Radio (NR) system, an evolution system of the NR system, a LTE-based access to unlicensed spectrum (LTE-U) system, a NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next-generation of communication system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), and Vehicle to Vehicle (V2V) communication, etc. The embodiments of the present disclosure can also be applied to these communication systems.

Figure 1:
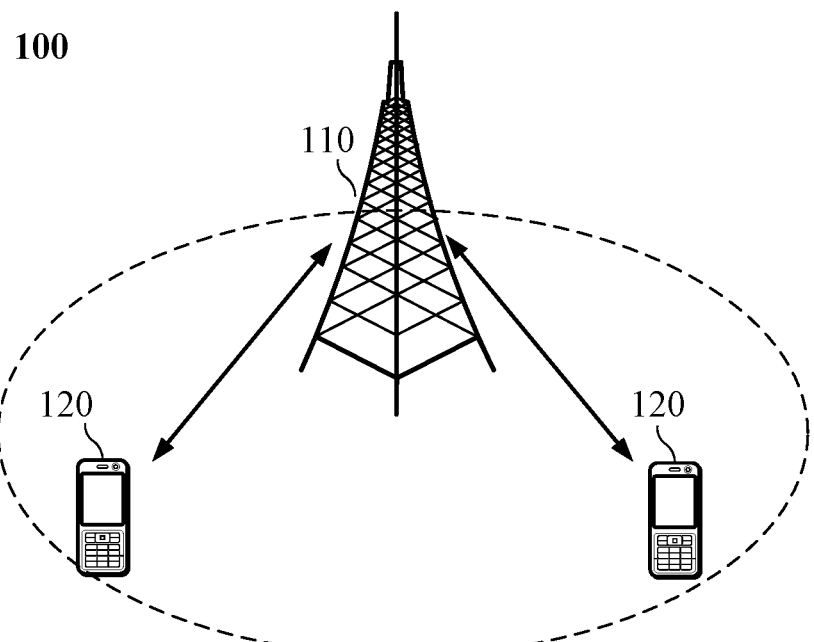
FIG. 1 is a schematic diagram showing a communication system architecture according to an embodiment of the present disclosure.

Exemplarily, a communication system 100 applied in an embodiment of the present disclosure is as illustrated in FIG. 1. The communication system 100 may include a network device 110. The network device 110 may be a device that communicates with a terminal device 120 (or called a communication terminal or a terminal). The network device 110 may provide communication coverage for a specific geographic region, and may communicate with a terminal device located in the coverage region. In at least one embodiment, the network device 110 may be a base station such as Base Transceiver Station (BTS) in a GSM system or a CDMA system, a base station such as NodeB (NB) in a WCDMA system, a base station such as Evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 also includes at least one terminal device 120 located within the coverage region of the network device 110. The "terminal device" used herein includes, but is not limited to, a device configured to receive/transmit a communication signal via a wired line connection, such as a Public Switched Telephone Network (PSTN), a Digital Subscriber Line (DSL), a digital cable, a direct cable connection, and/or another data connection/network; and/or via a wireless interface of, for example, a cellular network, a Wireless Local Area Network (WLAN), a digital television network such as a Digital Video Broadcasting Handheld (DVB-H), a satellite network, and an Amplitude Modulation-Frequency Modulation (AM-FM) broadcast transmitter, and/or another terminal device; and/or an Internet of Things (IoT) device. A terminal device configured to communicate through the wireless interface may be referred to as a "wireless communication terminal", a "wireless terminal", or a "mobile terminal". Examples of the mobile terminal include but are not limited to, a satellite or a cellular phone; a Personal Communication System (PCS) terminal that may combine a cellular radiotelephone with capabilities such as data processing, facsimile and data communication; a Personal Digital Assistant (PDA) that may include a radiotelephone, a pager, an Internet/intranet access, a Web browser, a notepad, a calendar, and/or a Global Positioning System (GPS) receiver; and a conventional laptop and/or palmtop receiver, or other electronic devices including a radiotelephone transceiver. The terminal device can refer to an access terminal, User Equipment (UE), a user unit, a user station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal device in a 5G network, or a terminal device in the future evolved PLMN, etc.

In at least one embodiment, direct terminal connection (Device to Device, D2D) communication may be performed between the terminal devices 120.

In at least one embodiment, the 5G system or the 5G network may also be referred to as a New Radio (NR) system or an NR network.

FIG. 1 exemplarily illustrates one network device and two terminal devices. In at least one embodiment, the communication system 100 may include a plurality of network devices, and coverage of each network device may include terminal devices of another number. The embodiments of the present disclosure are not limited to any of these examples.

In at least one embodiment, the communication system 100 may also include other network entities such as a network controller and a mobility management entity, and this embodiment of the present disclosure is not limited to any of these examples.

It should be understood that a device having a communication function in a network/system according to an embodiment of the present disclosure may be referred to as a communication device. Taking the communication system 100 illustrated in FIG. 1 as an example, the communication device may include the network device 110 and the terminal device 120 that each has a communication function. The network device 110 and the terminal device 120 may be specific devices described above, which will not be repeated here. The communication device may also include another device in the communication system 100, for example other network entities such as a network controller, a mobility management entity, etc., and embodiments of the present disclosure are not limited to any of these examples.

It should be understood that terms "system" and "network" in the present disclosure are often used interchangeably herein. The term "and/or" in the present disclosure is only an association relationship describing associated objects, and means that there can be three kinds of relationships. For example, A and/or B can mean three situations: A exists alone, A and B exist at the same time, and B exists alone. In addition, the character "/" in the present disclosure generally represents that associated objects before and after are the character "/" in an "or" relationship.

In order to facilitate understanding of the technical solutions of the embodiments of the present disclosure, the related art of the embodiments of the present disclosure are described below. Any combination of the following related art and the technical solutions of the embodiments of the present disclosure belongs to the protection scope of the embodiments of the present disclosure.

In order to allow various communication systems that use an unlicensed frequency spectrum for wireless communication to coexist friendly on the unlicensed frequency spectrum, some countries or regions have stipulated legal requirements that must be met when using the unlicensed frequency spectrum. For example, a communication device follows the "Listen Before Talk (LBT)" principle. That is, the communication device needs to perform channel listening before transmitting signals on a channel of the unlicensed frequency spectrum. Only when a result of the channel listening indicates that the channel is idle, the communication device can transmit a signal on the channel. When the result of the channel listening of the communication device on the channel of the unlicensed frequency spectrum indicates that the channel is busy, the communication device cannot transmit any signal on the channel. In order to ensure fairness, in one transmission, a time duration that the communication device uses the channel of the unlicensed frequency spectrum for signal transmission cannot exceed Maximum Channel Occupancy Time (MCOT).

In at least one embodiment, in an embodiment of the present disclosure, the communication device may have the following four types of channel access schemes when performing LBT. Here, a bandwidth of the LBT may be 20 MHz, or an integer multiple of 20 MHz:

Category 1 (Cat-1 LBT): transmission immediately after an end of a switching gap
   suitable for transmission switching within one Channel Occupancy Time (COT)
   the switching gap does not exceed a specific time duration, such as 16 μs Category 2 (Cat-2 LBT): one-slot sensing, also known as LBT without random backoff
   signal transmission can be performed when the channel is idle within one time of detection time, and signal transmission cannot be performed when the channel is occupied
   a time duration of one-slot sensing can be different under different switching gaps, e.g., a value of the time duration of one-slot sensing can be greater than 16 μs and smaller than or equal to 25 μs Category 3 (Cat-3 LBT): LBT with random backoff based on a fixed Contention Window Size (CWS)
   the communication device determines that CWS is $CW_p$
   $CW_p$ is a fixed value
   the communication device generates a random number N based on the value of $CW_p$
   the communication device performs channel sensing on the unlicensed frequency spectrum, and can perform signal transmission after successful channel sensing in N time slots Category 4 (Cat-4 LBT): LBT with random backoff based on variable CWS
   the communication device determines that CWS is $CW_p$
   $CW_p$ is a variable value
   the communication device generates a random number N based on the value of $CW_p$
   the communication device performs channel sensing on the unlicensed frequency spectrum, and can perform signal transmission after successful channel sensing in N time slots In at least one embodiment, Cat-3 LBT and Cat-4 LBT further distinguish priorities of channel access schemes based on priorities of transmission services.

In at least one embodiment, in an embodiment of the present disclosure, MCOT refers to a maximum time duration allowed to use the channel of the unlicensed frequency spectrum for signal transmission after the LBT is successful. There are different MCOTs under different channel access priorities. In at least one embodiment, the MCOT is time occupied by signal transmission.

In at least one embodiment, in an embodiment of the present disclosure, COT refers to a time duration during which the channel of the unlicensed frequency spectrum is used for transmission of a signal after the LBT is successful, and the occupation of the channel by the signal may be discontinuous during the time duration. In at least one embodiment, one time of COT cannot exceed 20 ms at the longest, and a time duration occupied by signal transmission within the COT does not exceed MCOT.

In at least one embodiment, in an embodiment of the present disclosure, channel occupancy time of a base station is also referred to as base station-initiated COT (gNB-initiated COT), which refers to channel occupancy time obtained after the LBT of the base station succeeds. The channel occupancy time of the base station can not only be used for downlink transmission, but also can be used for uplink transmission of the UE under certain conditions.

In at least one embodiment, in an embodiment of the present disclosure, channel occupancy time of the UE is also referred to as UE-initiated COT, which refers to channel occupancy time obtained after the LBT of the UE succeeds.

In at least one embodiment, in an embodiment of the present disclosure, a downlink transmission burst (DL burst) refers to a group of downlink transmissions (i.e., including one or more downlink transmissions) performed by the base station. The group of downlink transmissions is continuous (i.e., no gap exists between a plurality of downlink transmissions, or downlink time units included in one downlink transmission burst are continuous). If there is a gap between two downlink transmissions performed by the base station, it is determined that the two downlink transmissions belong to two downlink transmission bursts. In at least one embodiment, one downlink transmission refers to one Physical Downlink Shared Channel (PDSCH).

In at least one embodiment, in an embodiment of the present disclosure, an uplink transmission burst (UL burst) refers to a group of uplink transmissions (i.e., including one or more uplink transmissions) performed by the UE. The group of uplink transmissions is continuous (i.e., no gap exists between a plurality of uplink transmissions, or uplink time units included in one uplink transmission burst are continuous). If there is a gap between two uplink transmissions performed by the UE, it is determined that the two uplink transmissions belong to two uplink transmission bursts. In at least one embodiment, one uplink transmission refers to one Physical Uplink Shared Channel (PUSCH).

In at least one embodiment, in an embodiment of the present disclosure, channel access schemes applied in different transmission scenarios are different, and channel access schemes applied to different signals or channels are also different.

For example, Table 1 specifies channel access schemes in different situations when a base station initiates a COT:

TABLE 1

| | Channel access schemes of the base station | | |
|---|---|---|---|
| Target signal | Cat-2 LBT | Cat-4 LBT |
| DRS Only, or DRS is multiplexed with non-unicast data (such as OSI, paging, RAR, etc.) | If a duty cycle of DRS is ≤1/20, and a total length of the DRS is ≤1 ms, a single LBT of 25 μs is used | If a duty cycle of DRS is >1/20, or a total length of the DRS >1 ms |
| DRS is multiplexed with unicast data | Usually not supported | Channel access priority is determined based on a service priority |
| Physical Downlink Control Channel (PDCCH) and PDSCH | Usually not supported | Channel access priority is determined based on a service priority |

It should be understood that, when a service includes data multiplexing transmissions at a plurality of priorities, the channel access priority is determined based on data at the lowest priority among the plurality of priorities.

Figure 2:
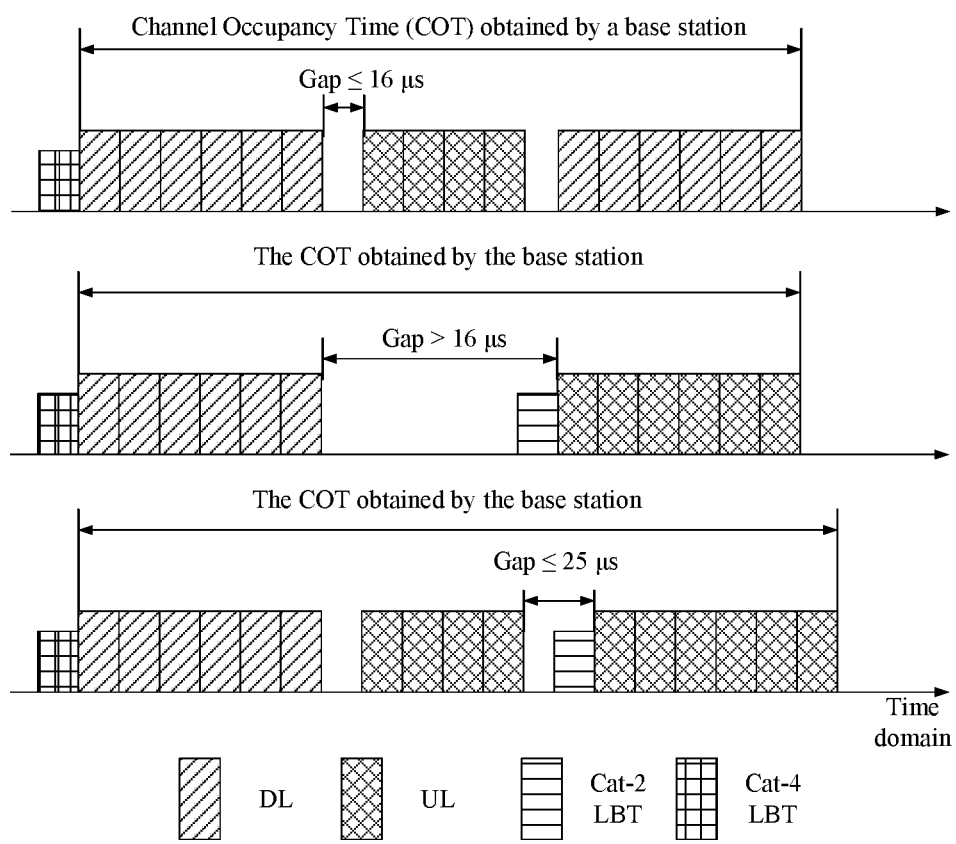
FIG. 2 is a schematic diagram showing User Equipment (UE) performing uplink transmission after a base station initiates Channel Occupancy Time (COT) according to an embodiment of the present disclosure.

For another example, referring to FIG. 2, after the base station initiates the COT, resources in the COT can be used by the UE for the uplink transmission. For any uplink transmission burst that occurs in the COT of the base station, if a gap between a start position of the uplink transmission burst and an end position of the downlink transmission burst is smaller than or equal to 16 µs, the UE can perform the uplink transmission immediately. If there is no downlink transmission burst after the uplink transmission burst in the COT of the base station, the UE can perform Cat-2 LBT, i.e., the one-slot sensing, before the transmission. If a gap between any two adjacent transmissions is smaller than or equal to 25 µs in the COT of the base station, the UE can perform Cat-2 LBT, i.e., the one-slot sensing.

For another example, when the UE initiates the COT, Table 2 specifies channel access schemes in different situations:

TABLE 2

Channel access schemes of the UE

| | Cat-2 LBT | Cat-4 LBT |
|---|---|---|
| PUSCH (including at least user plane data) | Not supported, unless only uplink control information is included in the PUSCH, such as Hybrid Automatic Repeat reQuest (HARQ)-Acknowledgement (ACK), SR, and Channel State Information (CSI) | Channel access priority is determined based on a service priority |
| Sounding Reference Signal (SRS) only | Not supported | Highest channel access priority |
| Random Access Channel (RACH) only | To be determined | Highest channel access priority |
| Physical Uplink Control Channel (PUCCH) only | To be determined | Highest channel access priority |

The above technologies specify channel access schemes applied in different transmission scenarios. Existing channel access schemes have the following problems.

Problem 1: in the related art, the COT initiated by the base station can include several uplink and downlink conversion points. It is stipulated that in the COT initiated by the base station, if a gap between an end position of one transmission burst and a start position of its next transmission burst is smaller than or equal to 16 µs, the next transmission burst can use Cat-1 LBT. That is, transmission of the next transmission burst is performed without channel sensing. If a gap between an end position of one transmission burst and a start position of its next transmission burst is greater than 16 µs, the next transmission burst can use Cat-2 LBT. However, if a gap between an end position of the 1st transmission burst and a start position of the 2nd transmission burst is greater than 16 µs, and a gap between an end position of the 2nd transmission burst and a start position of the 3rd transmission burst is smaller than or equal to 16 µs, as illustrated in FIG. 3, the 2nd transmission burst may fail since Cat-2 LBT is required before the 2nd transmission burst starts. In this case, starting transmission of the 3rd transmission burst directly will cause serious interference on an unlicensed carrier.

Problem 2: In the related art, in the COT initiated by the base station, if the COT of the base station is to be shared without LBT for transmission, a gap between an end position of one transmission burst and a start position of its next transmission burst needs to be smaller than or equal to 16 µs. However, for the terminal device, switching time from downlink reception to uplink transmission is usually greater than 16 µs, for example, 20 µs. As illustrated in FIG. 4, if the terminal device switches from downlink to uplink after receiving a downlink channel, start time of the uplink transmission will be missed. If a delay of the downlink reception and Timing Advance (TA) of the uplink transmission are taken into consideration, a problem of a delay of the uplink transmission is more serious.

In order to solve the above problems, the following technical solutions of the embodiments of the present disclosure are proposed.

FIG. 5 is a first flowchart illustrating a wireless communication method for an unlicensed frequency spectrum according to an embodiment of the present disclosure. As illustrated in FIG. 5, the wireless communication method for the unlicensed frequency spectrum includes part or all of the following steps.

At block 501, first information is transmitted, by a first device, to a second device on a first transmission burst within first Channel Occupancy Time (COT). A channel access scheme corresponding to the first transmission burst is determined based on a second transmission burst. The second transmission burst is a last transmission burst before the first transmission burst within the first COT. The first COT is COT obtained by the first device or COT obtained by the second device.

In an embodiment of the present disclosure, the channel access scheme corresponding to the first transmission burst being determined based on the second transmission burst can be implemented in at least one of the following manners.

Manner 1:

The first transmission burst is an N-th transmission burst within the first COT, and the second transmission burst is an (N−1)-th transmission burst within the first COT, where N is a positive integer greater than or equal to 2. The following describes the channel access scheme corresponding to the first transmission burst in different cases in combination with a value of N.

1) The Value of N is 2

When the value of N is 2, the second transmission burst is the 1st transmission burst within the first COT, and the first transmission burst is the 2nd transmission burst within the first COT.

Case 1: If a first time duration is smaller than or equal to a first threshold, the channel access scheme corresponding to the first transmission burst is a first channel access scheme. In this way, the LBT may be omitted for transmission on the 2nd transmission burst within one COT, thereby obtaining benefits of channel sharing, improving channel access opportunities, and avoiding interfering with other transmissions on the unlicensed frequency spectrum.

Case 2: If the first time duration is greater than the first threshold, the channel access scheme corresponding to the first transmission burst is a second channel access scheme.

Here, the first time duration is a time duration between end time of the second transmission burst and start time of the first transmission burst.

Here, in the first channel access scheme, no channel sensing is required before transmitting on a transmission burst, i.e., Cat-1 LBT. In the second channel access scheme, one-slot channel sensing is required before transmitting on a transmission burst, i.e., Cat-2 LBT.

In an implementation of the present disclosure, a value of the first threshold is 16 µs.

2) N is a Positive Integer Having a Value Greater than 2

When a channel access scheme corresponding to at least one transmission burst from the 2nd transmission burst to the (N−1)-th transmission burst within the first COT is the second channel access scheme, the channel access scheme corresponding to the first transmission burst is the second channel access scheme. In this way, interference to other transmissions on the unlicensed frequency spectrum can be avoided.

Here, in the second channel access scheme, one-slot channel sensing is required before transmitting on a transmission burst, i.e., Cat-2 LBT.

3) N is a Positive Integer Having a Value Greater than 2

Case 1: when each of channel access schemes corresponding to the 2nd transmission burst to the (N−1)-th transmission burst within the first COT is a first channel access scheme, and a first time duration is smaller than or equal to a first threshold, the channel access scheme corresponding to the first transmission burst is the first channel access scheme. Specifically, in one COT, if all the transmission bursts from the 2nd transmission burst to the (N−1)-th transmission burst do not perform the LBT before transmission, it means that the 2nd to the (N−1)-th transmission burst can be transmitted. Therefore, when the N-th transmission burst is transmitted, the LBT can also be omitted, such that the benefits of channel sharing can be obtained, the channel access opportunities are improved, and interference to other transmissions on the unlicensed frequency spectrum can be avoided.

Case 2: when each of the channel access schemes corresponding to the 2nd transmission burst to the (N−1)-th transmission burst within the first COT is the first channel access scheme, and the first time duration is greater than the first threshold, the channel access scheme corresponding to the first transmission burst is the second channel access scheme.

Case 3: each of the channel access schemes corresponding to the 2nd transmission burst to the (N−1)-th transmission burst within the first COT is the first channel access scheme. If a channel transmitted on at least one transmission burst from the 2nd transmission burst to the (N−1)-th transmission burst within the first COT only includes HARQ-ACK information corresponding to the PDSCH (e.g., PUCCH, or PUSCH including only uplink control information, used to transmit the HARQ-ACK information), the channel access scheme corresponding to the first transmission burst is the second channel access scheme. This is mainly because that if the terminal device does not detect the PDCCH transmitted to the terminal device by the network device, the terminal device will neither receive the PDSCH scheduled by the PDCCH, nor transmit the HARQ-ACK information on a corresponding uplink channel. Therefore, even all the transmission bursts from the 2nd transmission burst to the (N−1)-th transmission burst do not perform the LBT before the transmission in one COT, as long as the 2nd transmission burst to the (N−1)-th transmission burst includes one uplink transmission burst that is only used to transmit the HARQ-ACK information, there is a certain probability that the uplink transmission burst cannot be transmitted when downlink grant transmitted by the network device is lost. In this case, one-slot channel sensing can be performed during the transmission of the N-th transmission burst to prevent interference to other transmissions on the unlicensed frequency spectrum.

Here, the first time duration is the time duration between the end time of the second transmission burst and the start time of the first transmission burst.

Here, in the first channel access scheme, no channel sensing is required before transmitting on a transmission burst, i.e., Cat-1 LBT. In the second channel access scheme, the one-slot channel sensing is required before transmitting on a transmission burst, i.e., Cat-2 LBT.

In an implementation of the present disclosure, the value of the first threshold is 16 μs.

Manner 2:

If the channel access scheme corresponding to the second transmission burst is the second channel access scheme, the channel access scheme corresponding to the first transmission burst is the second channel access scheme. In this way, interference to other transmissions on the unlicensed frequency spectrum can be avoided.

Here, in the second channel access scheme, the one-slot channel sensing is required before transmitting on a transmission burst, i.e., Cat-2 LBT.

Manner 3:

Case 1: when the first device receives second information on the second transmission burst before transmitting on the first transmission burst, and the first time duration is smaller than or equal to the first threshold, the channel access scheme corresponding to the first transmission burst is the first channel access scheme. Specifically, if information transmitted on the second transmission burst is received in one COT, it means that the second transmission burst includes signal transmission within a system. Therefore, the first transmission burst can also be transmitted without performing the LBT, such that the benefits of channel sharing can be obtained, the channel access opportunities are improved, and interference to other transmissions on the unlicensed frequency spectrum can be avoided.

Case 2: when the first device receives the second information on the second transmission burst before transmitting on the first transmission burst, and the first time duration is greater than the first threshold, the channel access scheme corresponding to the first transmission burst is the second channel access scheme.

Case 3: when the first device does not receive the second information on the second transmission burst before transmitting on the first transmission burst, the channel access scheme corresponding to the first transmission burst is the second channel access scheme.

Here, the first time duration is a time duration between the end time of the second transmission burst and start time of the first transmission burst.

Here, in the first channel access scheme, no channel sensing is required before transmitting on a transmission burst, i.e., Cat-1 LBT. In the second channel access scheme, the one-slot channel sensing is required before transmitting on a transmission burst, i.e., Cat-2 LBT.

It should be understood that the above manners can also be used in combination. For example, the first device is the network device, and each of the channel access schemes corresponding to the 2nd transmission burst to the (N−1)-th transmission burst within the first COT is the first channel access scheme. The channel transmitted on the (N−1)-th transmission burst only includes the HARQ-ACK information corresponding to the PDSCH. If the network device does not receive the HARQ-ACK information on the (N−1)-th transmission burst, the channel access scheme corresponding to the first transmission burst is the second channel access scheme. If the network device receives the HARQ-ACK information on the (N−1)-th transmission burst, and the first time duration is smaller than or equal to the first threshold, the channel access scheme corresponding to the first transmission burst is the first channel access scheme. If the network device receives the HARQ-ACK information on the (N−1)-th transmission burst, and the first time duration is greater than the first threshold, the channel access scheme corresponding to the first transmission burst is the second channel access scheme.

In an implementation of the present disclosure, the first threshold is 16 μs.

In an implementation of the present disclosure, the second information includes at least one of HARQ-ACK feedback information, information for transport block decoding, a control channel, a reference signal.

In at least one embodiment, the first device and the second device may be implemented in different manners. The following describes specific content of the second information in combination with different implementation manners of the first device and the second device.

Implementation Manner 1:

The first device is the network device, and the second device is the terminal device.

The first device receives the second information on the second transmission burst before transmitting on the first transmission burst. The second information includes information indicating correct decoding of an uplink transport block transmitted by the terminal device on the second transmission burst and/or uplink control information transmitted by the terminal device on the second transmission burst.

In at least one embodiment, receiving the information indicating correct decoding of an uplink transport block may mean that the network device receives at least one PUSCH transmitted on the second transmission burst, and correctly decodes a transport block on the PUSCH.

In at least one embodiment, receiving the uplink control information may refer to that the network device detects the PUCCH or the HARQ-ACK information on the second transmission burst.

Implementation Manner 2:

The first device is the terminal device, and the second device is the network device.

The first device receives the second information on the second transmission burst before transmitting on the first transmission burst. The second information includes information indicating correct decoding of a downlink transport block transmitted by the network device on the second transmission burst and/or a PDCCH transmitted by the network device on the second transmission burst.

In at least one embodiment, receiving the information indicating correct decoding of a downlink transport block may refer to that the terminal device receives at least one PDSCH transmitted on the second transmission burst, and correctly decodes a transport block on the PDSCH.

In at least one embodiment, receiving the PDCCH may refer to that the terminal device detects the PDCCH on the second transmission burst (e.g., cyclic redundancy check of the PDCCH is successful).

Implementation Manner 3:

The first device is a first terminal device, and the second device is a second terminal device.

The first device receives the second information on the second transmission burst before transmitting on the first transmission burst. The second information includes scheduling information and/or information for transport block decoding transmitted by the second terminal device to the first terminal device on the second transmission burst.

In at least one embodiment, receiving the scheduling information of the second terminal device may refer to that the first terminal device receives indication information carried by data transmitted by the second terminal device on the second transmission burst.

In at least one embodiment, receiving the information for transport block decoding of the second terminal device may refer to that the first terminal device receives a transport block transmitted by the second terminal device on the second transmission burst, and completes decoding of the transport block.

The above technical solutions of the embodiments of the present disclosure will be exemplified below in combination with specific application examples.

Application Example 1

The first device is the network device, and the second device is the terminal device. By way of example but not limitation, as illustrated in FIG. 6, the COT obtained by the network device includes three transmission bursts. The 1st transmission burst includes the PDSCH transmitted by the network device to the terminal device. The 2nd transmission burst includes the HARQ-ACK information transmitted by the terminal device to the network device with respect to a decoding condition of the PDSCH. If the network device obtains, before the 3rd transmission burst, the HARQ-ACK information transmitted by the terminal device on the 2nd transmission burst, and a gap between an end position of the 2nd transmission burst and a start position of the 3rd transmission burst is smaller than or equal to a first preset value, the network device may directly transmit the 3rd transmission burst without performing the LBT.

Application Example 2

The first device is the terminal device, and the second device is the network device. By way of example but not limitation, as illustrated in FIG. 7, the COT obtained by the terminal device includes three transmission bursts. The 1st transmission burst includes the PUSCH transmitted by the terminal device to the network device. The 2nd transmission burst includes uplink grant information transmitted by the network device to the terminal device. The uplink grant information is used to schedule the terminal device or another terminal device to transmit the PUSCH through the 3rd transmission burst. After the terminal device receives uplink grant information, if the gap between the end position of the 2nd transmission burst and the start position of the 3rd transmission burst is smaller than or equal to the first preset value, the terminal device or another terminal device may directly transmit the 3rd transmission burst without performing the LBT.

Application Example 3

The first device is the first terminal device, and the second device is the second terminal device. By way of example but not limitation, as illustrated in FIG. 8, the COT obtained by the first terminal device includes three transmission bursts. The 1st transmission burst includes the PSSCH transmitted by the first terminal device to the second terminal device. The 2nd transmission burst includes the HARQ-ACK information transmitted by the second terminal device to the first terminal device with respect to a decoding condition of the PSSCH. For example, Negative Acknowledgement (NACK) is fed back to the first terminal device in response to a decoding error. If the first terminal device obtains, before the 3rd transmission burst, NACK information transmitted by the second terminal device on the 2nd transmission burst, and the gap between the end position of the 2nd transmission burst and the start position of the 3rd transmission burst is smaller than or equal to the first preset value, the first terminal device may directly transmit the 3rd transmission burst without performing the LBT. Also, the transmission on the 3rd transmission burst includes retransmission of the PSSCH corresponding to the NACK information.

FIG. 9 is a second schematic flowchart illustrating a wireless communication method for an unlicensed frequency spectrum according to an embodiment of the present disclosure. As illustrated in FIG. 9, the wireless communication method for the unlicensed frequency spectrum includes part or all of the following steps.

At block 901, uplink information is transmitted, by a terminal device, to a network device on a first transmission burst. The first transmission burst is a transmission burst within first COT obtained by the network device. A second transmission burst is a last transmission burst before the first transmission burst within the first COT. A first time interval between end time of the second transmission burst and start time of the first transmission burst is shorter than or equal to a first threshold.

In an embodiment of the present disclosure, the second transmission burst is a transmission burst for the network device to perform downlink transmission, and the first transmission burst is a transmission burst for the terminal device to perform uplink transmission. Specifically, the second transmission burst includes a resource for the network device to transmit a downlink channel or a downlink signal to the terminal device, and the first transmission burst includes a resource for the terminal device to transmit an uplink channel or an uplink signal to the network device.

1) In an implementation of the present disclosure, the terminal device does not expect to receive any signal in a first time period at an end of the second transmission burst. Further, the first time period includes a last symbol in the second transmission burst. In at least one embodiment, the first time period includes no downlink channel or downlink signal transmitted by the network device to the terminal device. In at least one embodiment, the first time period includes no Synchronizing Signal/PBCH Block (SSB), and/or a Physical Downlink Control Channel (PDCCH) carrying common information, and/or a Physical Downlink Shared Channel (PDSCH) carrying common information.

For example, the terminal device does not expect to receive the PDCCH on the last symbol in the second transmission burst.

For example, the terminal device does not expect to receive the PDSCH on the last symbol in the second transmission burst. Here, the PDSCH includes a dedicated PDSCH, or the PDSCH includes the PDSCH carrying the common information such as System Information Block (SIB) information.

For example, the terminal device does not expect to receive the PBCH or the SSB on the last symbol in the second transmission burst.

For example, the terminal device does not expect to receive a reference signal, such as a CSI-Reference Signal (RS), on the last symbol in the second transmission burst.

For example, the terminal device does not expect to perform measurement on the last symbol in the second transmission burst, such as Radio Resource Management (RRM) measurement, Radio Link Management (RLM) measurement, and Received Signal Strength Indication (RSSI), etc.

In the above solution, a time interval for the terminal device to switch from signal reception to signal transmission is a second time interval. The second time interval is longer than the first time interval.

In at least one embodiment, in this embodiment, the first threshold is 16 μs.

2) In another implementation of the present disclosure, the terminal device transmits the uplink information to the network device at first time after the second transmission burst ends. A time interval between the end time of the second transmission burst and the first time is a second time interval for the terminal device to switch from signal reception to signal transmission.

Further, the second time interval is shorter than the first time interval. The terminal device transmits an extended cyclic prefix of a first symbol in the first transmission burst on a time resource between the first time and the start time of the first transmission burst.

It should be understood that the start time of the first transmission burst herein refers to start time of a first valid symbol in the first transmission burst.

In at least one embodiment, the first valid symbol in the first transmission burst refers to a first complete symbol in the first transmission burst.

For example, referring to FIG. 10, the terminal device receives indication information of the channel access scheme transmitted by the network device. The indication information is used to indicate that when the terminal device transmits the first transmission burst, a corresponding channel access scheme is Cat-1 LBT. Therefore, the terminal device immediately switches from downlink reception to uplink transmission after an end of the downlink reception, and starts transmitting the uplink signal after an end of the switching. Here, a time interval between the end time of downlink reception and start time of uplink transmission is a second time interval for the terminal device to switch from signal reception to signal transmission. If start time of uplink transmission is before start time of a first symbol carrying valid data in the first transmission burst, the terminal device can transmit a Cyclic Prefix (CP) extension part of the first symbol before the start time of the first symbol carrying the valid data. In FIG. 7, L represents the first time interval, and S represents the second time interval (i.e., DL-UL GAP). In at least one embodiment, L is greater than or equal to S. In at least one embodiment, when TA is taken into consideration, L is greater than or equal to (S+TA), where TA represents a round trip delay between the network device and the terminal device indicated by the network device to the terminal device.

In at least one embodiment, the first threshold is 16 μs.

In at least one embodiment, the first threshold is a time duration corresponding to one symbol.

3) In another embodiment of the present disclosure, prior to transmitting, by the terminal device, the uplink information to the network device on the first transmission burst, the terminal device reports indication information to the network device. The indication information is used to determine a second time interval for the terminal device to switch from signal reception to signal transmission or a range to which the second time interval belongs, or the indication information is used to indicate an ability of the terminal device to switch from signal reception to signal transmission.

Here, the first time interval is determined by the network device based on the indication information. Further, the second time interval is smaller than or equal to the first time interval.

Specifically, the terminal device reports the second time interval or the range to which the second time interval belongs to the network device for reference, such that the network device can integrate various factors to perform downlink scheduling and transmission on the terminal device. For example, the network device may determine a suitable first time interval for the terminal device. For example, the first time interval is greater than or equal to the second time interval.

In at least one embodiment, in this embodiment, the first threshold is 16 μs.

FIG. 11 is a third schematic flowchart illustrating a wireless communication method for an unlicensed frequency spectrum according to an embodiment of the present disclosure. As illustrated in FIG. 11, the wireless communication method for the unlicensed frequency spectrum includes part or all of the following steps.

At block 1101, a network device transmits downlink information to a terminal device on a first transmission burst. The first transmission burst is a transmission burst within first COT obtained by the terminal device. A second transmission burst is a last transmission burst before the first transmission burst within the first COT. A first time interval between end time of the second transmission burst and start time of the first transmission burst is shorter than or equal to a first threshold.

In an embodiment of the present disclosure, the second transmission burst is a transmission burst for the terminal device to perform the uplink transmission, and the first transmission burst is a transmission burst for the network device to perform the downlink transmission. Specifically, the second transmission burst includes a resource for the terminal device to transmit an uplink channel or an uplink signal to the network device, and the first transmission burst includes a resource for the network device to transmit a downlink channel or a downlink signal to the terminal device.

1) In an implementation of the present disclosure, the network device does not expect to receive any signal in the first time period at the end of the second transmission burst. Further, the first time period includes the last symbol in the second transmission burst. Further, the second transmission burst is a transmission burst for the terminal device to perform the uplink transmission. The first time period includes no valid uplink channel or valid uplink signal from the terminal device.

In at least one embodiment, the valid uplink channel includes an uplink channel that carries useful information.

In at least one embodiment, the valid uplink signal includes a reference signal used for channel demodulation or measurement.

For example, the network device does not expect to receive a Physical Uplink Control Channel (PUCCH) on the last symbol in the second transmission burst.

For example, the network device does not expect to receive a Physical Uplink Shared Channel (PUSCH) on the last symbol in the second transmission burst.

For example, the network device does not expect to receive a Physical Random Access Channel (PRACH) on the last symbol in the second transmission burst.

For example, the network device does not expect to receive a reference signal, such as a Sounding Reference Signal (SRS), on the last symbol in the second transmission burst.

In the above solution, the time interval for the network device to switch from the signal reception to the signal transmission is the second time interval. The second time interval is greater than the first time interval.

In at least one embodiment, in this embodiment, the first threshold is 16 μs.

2) In another implementation of the present disclosure, the network device transmits the downlink information to the terminal device at first time after the second transmission burst ends. A time interval between the end time of the second transmission burst and the first time is a second time interval for the network device to switch from signal reception to signal transmission.

Further, the second time interval is shorter than the first time interval. The network device transmits an extended cyclic prefix of a first symbol in the first transmission burst on a time resource between the first time and the start time of the first transmission burst.

It should be understood that the start time of the first transmission burst herein refers to the start time of the first valid symbol in the first transmission burst.

In at least one embodiment, the first valid symbol in the first transmission burst refers to the first complete symbol in the first transmission burst.

Figure 12:
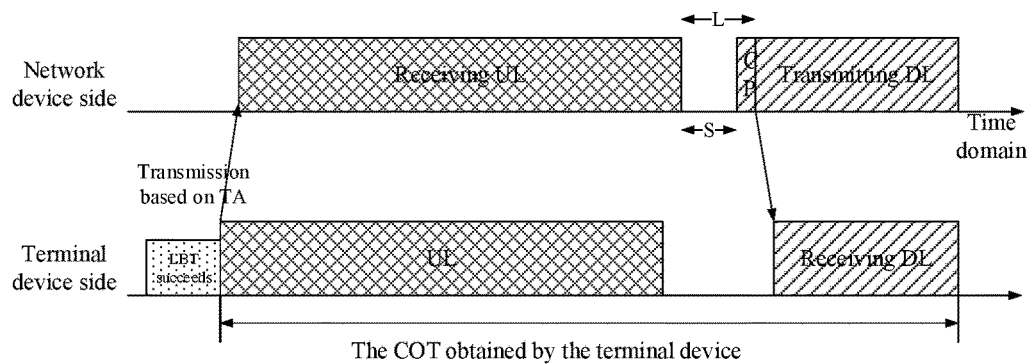
FIG. 12 is a schematic diagram of a transmission burst in a case of a conversion from uplink reception to downlink transmission according to an embodiment of the present disclosure.

For example, referring to FIG. 12, the network device determines that a corresponding channel access scheme is Cat-1 LBT when the first transmission burst is transmitted (for example, the network device receives indication information for channel sharing transmitted by the terminal device. The indication information includes information indicating that the corresponding channel access scheme is Cat-1 LBT when the network device transmits the first transmission burst, or the network device instructs the terminal device to share the COT in accordance with Cat-1 LBT). Therefore, the network device immediately switches from the uplink reception to the downlink transmission after the uplink reception ends, and starts the transmission of the downlink signal after the switching ends. Here, a time interval between the end time of the uplink reception and the start time of the downlink transmission is the second time interval (represented by S in the figure) for the network device to switch from signal reception to signal transmission. If the start time of the downlink transmission is before the start time of the first symbol carrying the valid data in the first transmission burst, the network device can transmit the CP extension part of the first symbol before the start time of the first symbol carrying the valid data.

In at least one embodiment, In an embodiment, the network device may transmit the indication information to the terminal device. The indication information is used by the terminal device to determine, when the first COT obtained by the terminal device is shared with the network device, information of whether performing padding (i.e., transmitting a placeholder signal) in the first time period at the end of the second transmission burst, and/or length information of the first time period, and/or an end position of valid information transmission in the second transmission burst, and/or an end position of the second transmission burst, and/or the channel access scheme corresponding to the first transmission burst (e.g., Cat-1 LBT or Cat-2 LBT).

In at least one embodiment, in this embodiment, the first threshold is 16 μs.

In at least one embodiment, in this embodiment, the first threshold is a time duration corresponding to one symbol.

Figure 13:
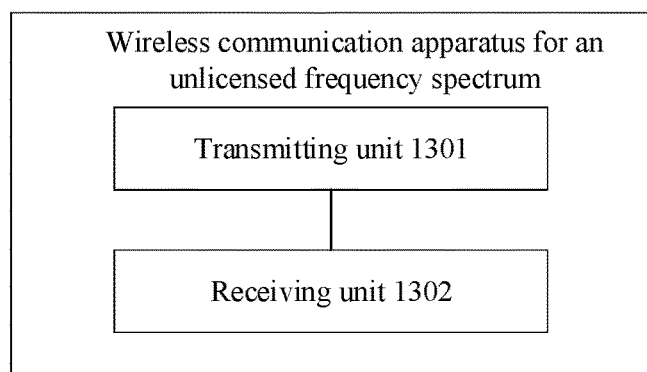
FIG. 13 is a first schematic diagram showing a structure of a wireless communication apparatus for an unlicensed frequency spectrum according to an embodiment of the present disclosure.

FIG. 13 is a first schematic diagram showing a structure of a wireless communication apparatus for an unlicensed frequency spectrum according to an embodiment of the present disclosure. The wireless communication apparatus for the unlicensed frequency spectrum is applied in the first device. As illustrated in FIG. 13, the wireless communication apparatus for the unlicensed frequency spectrum includes a transmitting unit 1301.

The transmitting unit 1301 is configured to transmit first information to a second device on a first transmission burst within first Channel Occupancy Time (COT).

Here, a channel access scheme corresponding to the first transmission burst is determined based on a second transmission burst. The second transmission burst is a last transmission burst before the first transmission burst within the first COT. The first COT is COT obtained by the first device or COT obtained by the second device.

In an embodiment, the first transmission burst is an N-th transmission burst within the first COT, and the second transmission burst is an (N−1)-th transmission burst within the first COT, where N is a positive integer greater than or equal to 2.

In an embodiment, N is a positive integer greater than 2. The channel access scheme corresponding to the first transmission burst being determined based on the second transmission burst includes that, when a channel access scheme corresponding to at least one transmission burst from the 2nd transmission burst to the (N−1)-th transmission burst within the first COT is a second channel access scheme, the channel access scheme corresponding to the first transmission burst is the second channel access scheme.

In an embodiment, the channel access scheme corresponding to the first transmission burst being determined based on the second transmission burst includes that, when a channel access scheme corresponding to the second transmission burst is the second channel access scheme, the channel access scheme corresponding to the first transmission burst is the second channel access scheme.

In an embodiment, N is a positive integer greater than 2. The channel access scheme corresponding to the first transmission burst being determined based on the second transmission burst includes one of: when each of channel access schemes corresponding to the 2nd transmission burst to the (N−1)-th transmission burst within the first COT is a first channel access scheme, and a first time duration is smaller than or equal to a first threshold, the channel access scheme corresponding to the first transmission burst being the first channel access scheme; and when each of the channel access schemes corresponding to the 2nd transmission burst to the (N−1)-th transmission burst within the first COT is the first channel access scheme, and the first time duration is greater than the first threshold, the channel access scheme corresponding to the first transmission burst being a second channel access scheme. Here, the first time duration is a time duration between end time of the second transmission burst and start time of the first transmission burst.

In an embodiment, the channel access scheme corresponding to the first transmission burst being determined based on the second transmission burst includes one of: when the first device receives second information on the second transmission burst before transmitting on the first transmission burst, and a first time duration is smaller than or equal to a first threshold, the channel access scheme corresponding to the first transmission burst being a first channel access scheme; when the first device receives the second information on the second transmission burst before transmitting on the first transmission burst, and the first time duration is greater than the first threshold, the channel access scheme corresponding to the first transmission burst being a second channel access scheme; and when the first device does not receive the second information on the second transmission burst before transmitting on the first transmission burst, the channel access scheme corresponding to the first transmission burst being the second channel access scheme. Here, the first time duration is a time duration between end time of the second transmission burst and start time of the first transmission burst.

In an embodiment, the second information includes at least one of Hybrid Automatic Repeat reQuest (HARD)-Acknowledgement (ACK) feedback information, information for transport block decoding, a control channel, and a reference signal.

In an embodiment, in the first channel access scheme, no channel sensing is required before transmitting on a transmission burst.

In an embodiment, in the second channel access scheme, one-slot channel sensing is required before transmitting on a transmission burst.

In an embodiment, the first device is a network device, and the second device is a terminal device.

In an embodiment, the apparatus further includes a receiving unit 1302.

The receiving unit 1302 is configured to receive second information on the second transmission burst before transmitting on the first transmission burst. The second information includes information indicating correct decoding of an uplink transport block transmitted by the terminal device on the second transmission burst and/or uplink control information transmitted by the terminal device on the second transmission burst.

In an embodiment, the first device is a terminal device, and the second device is a network device.

In an embodiment, the apparatus further includes a receiving unit 1302.

The receiving unit 1302 is configured to receive the second information on the second transmission burst before transmitting on the first transmission burst. The second information includes information indicating correct decoding of a downlink transport block transmitted by the network device on the second transmission burst and/or a Physical Downlink Control Channel (PDCCH) transmitted by the network device on the second transmission burst.

In an embodiment, the first device is a first terminal device, and the second device is a second terminal device.

In an embodiment, the apparatus further includes a receiving unit 1302.

The receiving unit 1302 is configured to receive the second information on the second transmission burst before transmitting on the first transmission burst. The second information includes scheduling information and/or information for transport block decoding transmitted by the second terminal device to the first terminal device on the second transmission burst.

A person skilled in the art should understand that the above relevant description of the wireless communication apparatus for the unlicensed frequency spectrum according to embodiments of the present disclosure can be understood with reference to relevant description of the wireless communication method for the unlicensed frequency spectrum according to embodiments of the present disclosure.

Figure 14:
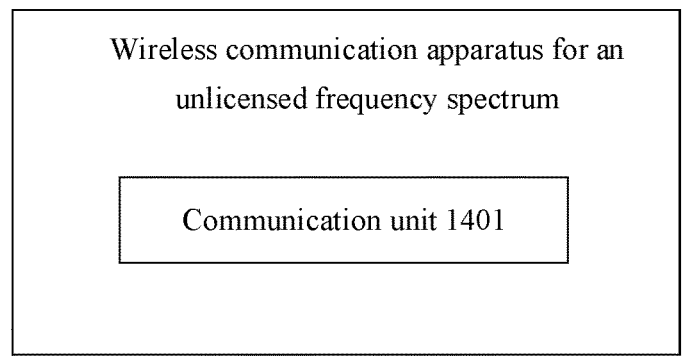
FIG. 14 is a second schematic diagram showing a structure of a wireless communication apparatus for an unlicensed frequency spectrum according to an embodiment of the present disclosure.

FIG. 14 is a second schematic diagram showing a structure of a wireless communication apparatus for an unlicensed frequency spectrum according to an embodiment of the present disclosure. The communication apparatus for the unlicensed frequency spectrum is applied in a terminal device. As illustrated in FIG. 14, the communication apparatus for the unlicensed frequency spectrum includes a communication unit 1401.

The communication unit 1401 is configured to transmit uplink information to a network device on a first transmission burst. Here, the first transmission burst is a transmission burst within first Channel Occupancy Time (COT) obtained by the network device. A second transmission burst is a last transmission burst before the first transmission burst within the first COT. A first time interval between end time of the second transmission burst and start time of the first transmission burst is shorter than or equal to a first threshold.

In an embodiment, the communication unit 1401 does not expect to receive any signal in a first time period at an end of the second transmission burst.

In an embodiment, the first time period includes a last symbol in the second transmission burst.

In an embodiment, the second transmission burst is a transmission burst for the network device to perform downlink transmission, and the first time period includes no downlink channel or downlink signal transmitted by the network device to the terminal device.

In an embodiment, the second transmission burst is a transmission burst for the network device to perform the downlink transmission, and the first time period includes no Synchronizing Signal/PBCH Block (SSB), and/or Physical Downlink Control Channel (PDCCH) carrying common information, and/or Physical Downlink Shared Channel (PDSCH) carrying common information.

In an embodiment, a time interval for the communication unit to switch from signal reception to signal transmission is a second time interval, and the second time interval is longer than the first time interval.

In an embodiment, the second transmission burst is a transmission burst for the network device to perform downlink transmission. The communication unit 1401 is configured to transmit the uplink information to the network device at first time after the second transmission burst ends. A time interval between the end time of the second transmission burst and the first time is a second time interval for the terminal device to switch from signal reception to signal transmission.

In an embodiment, the second time interval is shorter than the first time interval. The communication unit is further configured to transmit an extended cyclic prefix of a first symbol in the first transmission burst on a time resource between the first time and the start time of the first transmission burst.

In an embodiment, the communication unit 1401 is further configured to report indication information to the network device. The indication information is used to determine a second time interval for the terminal device to switch from signal reception to signal transmission or a range to which the second time interval belongs.

In an embodiment, the first time interval is determined by the network device based on the indication information.

In an embodiment, the second time interval is shorter than or equal to the first time interval.

A person skilled in the art should understand that the above relevant description of the wireless communication apparatus for the unlicensed frequency spectrum according to embodiments of the present disclosure can be understood with reference to relevant description of the wireless communication method for the unlicensed frequency spectrum according to embodiments of the present disclosure.

Figure 15:
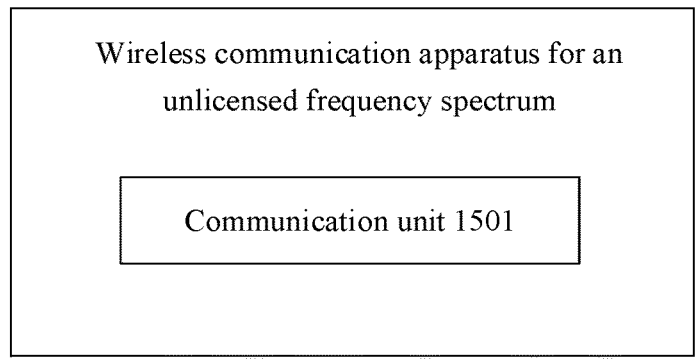
FIG. 15 is a third schematic diagram showing a structure of a wireless communication apparatus for an unlicensed frequency spectrum according to an embodiment of the present disclosure.

FIG. 15 is a third schematic diagram showing a structure of a wireless communication apparatus for an unlicensed frequency spectrum according to an embodiment of the present disclosure. The wireless communication apparatus for the unlicensed frequency spectrum is applied in a network device. As illustrated in FIG. 15, the wireless communication apparatus for the unlicensed frequency spectrum includes a communication unit 1501.

The communication unit 1501 is configured to transmit downlink information to a terminal device on a first transmission burst. Here, the first transmission burst is a transmission burst within first Channel Occupancy Time (COT) obtained by the terminal device. A second transmission burst is a last transmission burst before the first transmission burst within the first COT. A first time interval between end time of the second transmission burst and start time of the first transmission burst is shorter than or equal to a first threshold.

In an embodiment, the communication unit 1501 does not expect to receive any signal in a first time period at an end of the second transmission burst.

In an embodiment, the first time period includes a last symbol in the second transmission burst.

In an embodiment, the second transmission burst is a transmission burst for the terminal device to perform uplink transmission, and the first time period includes no valid uplink channel or valid uplink signal from the terminal device.

In an embodiment, a time interval for the communication unit 1501 to switch from signal reception to signal transmission is a second time interval. The second time interval is longer than the first time interval.

In an embodiment, the second transmission burst is a transmission burst for the terminal device to perform uplink transmission. The communication unit 1501 is configured to transmit the downlink information to the terminal device at first time after the second transmission burst ends. A time interval between the end time of the second transmission burst and the first time is a second time interval for the network device to switch from signal reception to signal transmission.

In an embodiment, the second time interval is shorter than the first time interval. The communication unit 1501 is further configured to transmit an extended cyclic prefix of a first symbol in the first transmission burst on a time resource between the first time and the start time of the first transmission burst.

A person skilled in the art should understand that the above relevant description of the wireless communication apparatus for the unlicensed frequency spectrum according to embodiments of the present disclosure can be understood with reference to relevant description of the wireless communication method for the unlicensed frequency spectrum according to embodiments of the present disclosure.

Figure 16:
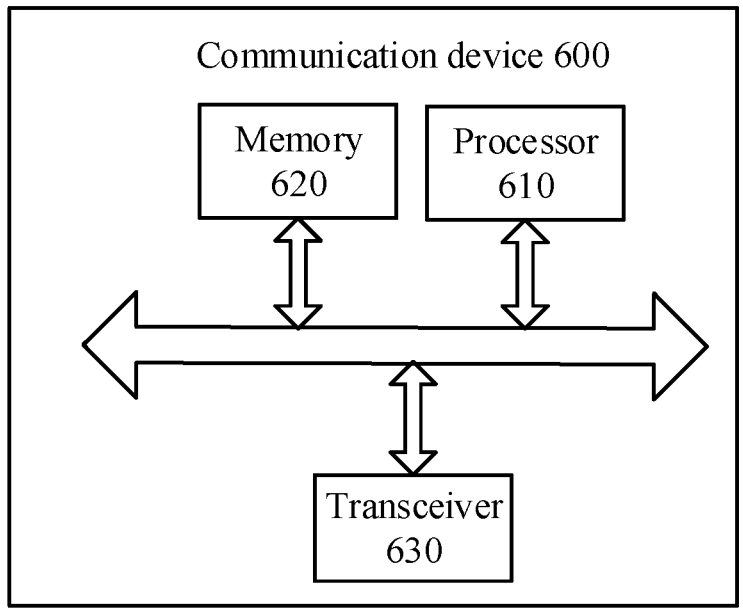
FIG. 16 is a schematic diagram showing a structure of a communication device according to an embodiment of the present disclosure.

FIG. 16 is a schematic diagram showing a structure of a communication device 600 according to an embodiment of the present disclosure. The communication device may be a terminal device or a network device. The communication device 600 illustrated in FIG. 16 includes a processor 610. The processor 610 is configured to invoke and run a computer program from a memory to perform the method according to an embodiment of the present disclosure.

In at least one embodiment, as illustrated in FIG. 16, the communication device 600 may further include a memory 620. The processor 610 may invoke and run a computer program from the memory 620 to perform the method according to an embodiment of the present disclosure.

Here, the memory 620 may be a separate component independent of the processor 610, or may be integrated in the processor 610.

In at least one embodiment, as illustrated in FIG. 16, the communication device 600 may further include a transceiver 630. The processor 610 may control the transceiver 630 to communicate with other devices. Specifically, information or data may be transmitted to other devices, or information or data transmitted by other devices may be received.

Here, the transceiver 630 may include a transmitter and a receiver. The transceiver 630 may further include one or more antennas.

In at least one embodiment, the communication device 600 may specifically be a network device according to an embodiment of the present disclosure. The communication device 600 may execute corresponding processes implemented by the network device in a method according to an embodiment of the present disclosure. For brevity, repeated description is omitted herein.

In at least one embodiment, the communication device 600 may specifically be the mobile terminal/terminal device according to an embodiment of the present disclosure. The communication device 600 may execute corresponding processes implemented by the mobile terminal/terminal device in a method according to an embodiment of the present disclosure. For brevity, repeated description is omitted herein.

Figure 17:
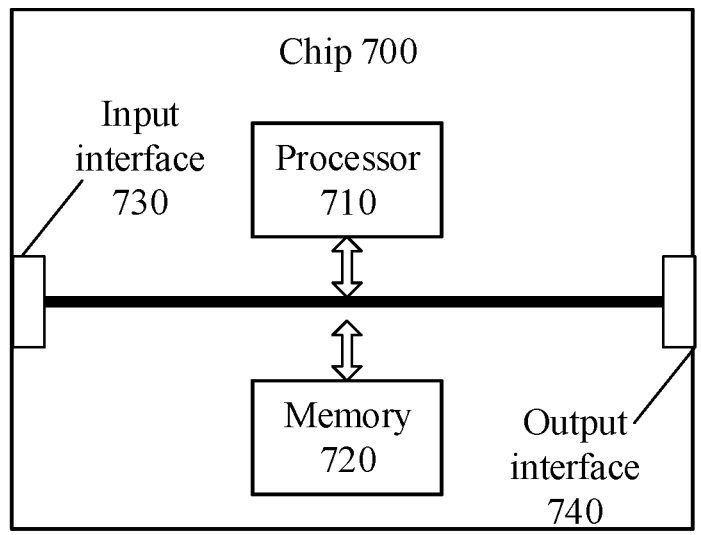
FIG. 17 is a schematic diagram showing a structure of a chip according to an embodiment of the present disclosure.

FIG. 17 is a schematic diagram showing a structure of a chip according to an embodiment of the present disclosure. A chip 700 illustrated in FIG. 17 includes a processor 710. The processor 710 can invoke and run a computer program from the memory to perform the method according to an embodiment of the present disclosure.

In at least one embodiment, as illustrated in FIG. 17, the chip 700 may further include a memory 720. The processor 710 may invoke and run a computer program from the memory 720 to perform the method according to an embodiment of the present disclosure.

Here, the memory 720 may be a separate component independent of the processor 710, or may be integrated in the processor 710.

In at least one embodiment, the chip 700 may further include an input interface 730. The processor 710 can control the input interface 730 to communicate with other devices or chips. Specifically, information or data transmitted by other devices or chips can be obtained.

In at least one embodiment, the chip 700 may further include an output interface 740. The processor 710 can control the output interface 740 to communicate with other devices or chips. Specifically, information or data may be transmitted to other devices or chips.

In at least one embodiment, the chip can be applied to the network device according to an embodiment of the present disclosure. In addition, the chip can execute corresponding processes implemented by the network device in a method according to an embodiment of the present disclosure. For brevity, repeated description is omitted herein.

In at least one embodiment, the chip can be applied to the mobile terminal/terminal device according to an embodiment of the present disclosure. The chip can execute corresponding processes implemented by the mobile terminal/terminal device in a method according to an embodiment of the present disclosure. For brevity, repeated description is omitted herein.

It should be understood that the chip mentioned in the embodiments of the present disclosure may also be referred to as a system-level chip, a system-chip, a chip system, or a system-on-chip.

Figure 18:
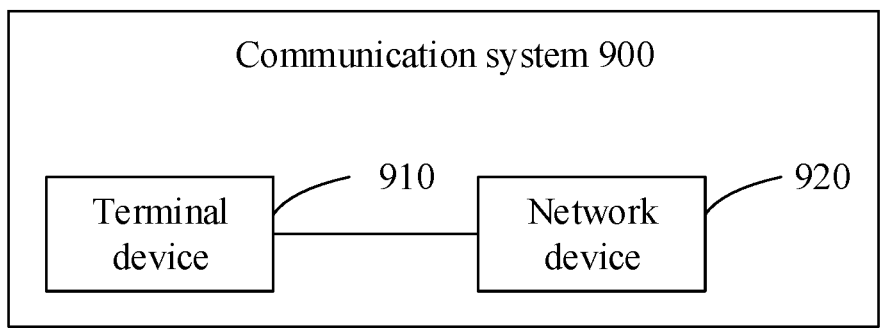
FIG. 18 is a schematic block diagram of a communication system according to an embodiment of the present disclosure.

FIG. 18 is a schematic block diagram of a communication system 900 according to an embodiment of the present disclosure. As illustrated in FIG. 18, the communication system 900 includes a terminal device 910 and a network device 920.

Here, the terminal device 910 can be configured to implement the corresponding functions implemented by the terminal device in the above method. The network device 920 can be configured to implement corresponding functions implemented by the network device in the above method. For brevity, repeated description is omitted herein.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

In at least one embodiment, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

In at least one embodiment, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

In at least one embodiment, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

In at least one embodiment, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

In at least one embodiment, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

In at least one embodiment, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, a Read-Only Memory (ROM), a Random Access Memory (RAM), a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A wireless communication method for an unlicensed frequency spectrum, comprising:

transmitting, by a first device, first information to a second device on a first transmission burst within first Channel Occupancy Time (COT), wherein a channel access scheme corresponding to the first transmission burst is determined based on a second transmission burst, the second transmission burst is a last transmission burst before the first transmission burst within the first COT, and the first COT is COT obtained by the first device or COT obtained by the second device;

the first transmission burst is an N-th transmission burst within the first COT, and the second transmission burst is an (N−1)-th transmission burst within the first COT, N being a positive integer greater than 2, and the channel access scheme corresponding to the first transmission burst is determined based on a first case or a second case;

the first case comprises at least one of:

when a channel access scheme corresponding to at least one transmission burst from the 2nd transmission burst to the (N−1)-th transmission burst within the first COT is a second channel access scheme, the channel access scheme corresponding to the first transmission burst being the second channel access scheme;

when each of channel access schemes corresponding to the 2nd transmission burst to the (N−1)-th transmission burst within the first COT is a first channel access scheme, and a first time duration is smaller than or equal to a first threshold, the channel access scheme corresponding to the first transmission burst being the first channel access scheme; or when each of the channel access schemes corresponding to the 2nd transmission burst to the (N−1)-th transmission burst within the first COT is the first channel access scheme, and the first time duration is greater than the first threshold, the channel access scheme corresponding to the first transmission burst being the second channel access scheme;

the second case comprises at least one of:

when a channel access scheme corresponding to the second transmission burst is the second channel access scheme, the channel access scheme corresponding to the first transmission burst being the second channel access scheme;

when the first device receives second information on the second transmission burst before transmitting on the first transmission burst, and a first time duration is smaller than or equal to a first threshold, the channel access scheme corresponding to the first transmission burst being a first channel access scheme;

when the first device receives the second information on the second transmission burst before transmitting on the first transmission burst, and the first time duration is greater than the first threshold, the channel access scheme corresponding to the first transmission burst being the second channel access scheme; or when the first device does not receive the second information on the second transmission burst before transmitting on the first transmission burst, the channel access scheme corresponding to the first transmission burst being the second channel access scheme;

wherein the first time duration is a time duration between end time of the second transmission burst and start time of the first transmission burst;

wherein in the first channel access scheme, no channel sensing is required before transmitting on a transmission burst;

wherein in the second channel access scheme, one-slot channel sensing is required before transmitting on a transmission burst.

2. The method according to claim 1, wherein the second information comprises at least one of Hybrid Automatic Repeat reQuest (HARQ)-Acknowledgement (ACK) feedback information, information for transport block decoding, a control channel, and a reference signal.

3. The method according to claim 1, wherein one of the first device and the second device is a network device, and another of the first device and the second device is a terminal device.

4. The method according to claim 3, wherein the first device is the network device, and the second device is the terminal device, the first device receives second information on the second transmission burst before transmitting on the first transmission burst, and the second information comprises information indicating correct decoding of an uplink transport block transmitted by the terminal device on the second transmission burst and/or uplink control information transmitted by the terminal device on the second transmission burst.

5. The method according to claim 3, wherein the first device is the terminal device, and the second device is the network device; the first device receives second information on the second transmission burst before transmitting on the first transmission burst, and the second information comprises information indicating correct decoding of a downlink transport block transmitted by the network device on the second transmission burst and/or a Physical Downlink Control Channel (PDCCH) transmitted by the network device on the second transmission burst.

6. The method according to claim 1, wherein the first device is a first terminal device, and the second device is a second terminal device.

7. The method according to claim 6, wherein the first device receives second information on the second transmission burst before transmitting on the first transmission burst, and the second information comprises scheduling information and/or information for transport block decoding transmitted by the second terminal device to the first terminal device on the second transmission burst.

8. A communication device, comprising:
a processor; and
a memory,
wherein the memory is configured to store a computer program, and the processor is configured to invoke and run the computer program stored in the memory to perform the method according to claim 1.

9. A wireless communication method for an unlicensed frequency spectrum, comprising:
transmitting, by a terminal device, uplink information to a network device on a first transmission burst,
wherein the first transmission burst is a transmission burst within first Channel Occupancy Time (COT) obtained by the network device, a second transmission burst is a last transmission burst before the first transmission burst within the first COT, and a first time interval between end time of the second transmission burst and start time of the first transmission burst is shorter than or equal to a first threshold; and
the first transmission burst is an N-th transmission burst within the first COT, and the second transmission burst is an (N−1)-th transmission burst within the first COT, N being a positive integer greater than 2, and the channel access scheme corresponding to the first transmission burst is determined based on a first case or a second case;

the first case comprises at least one of:

when a channel access scheme corresponding to at least one transmission burst from the 2nd transmission burst to the (N−1)-th transmission burst within the first COT is a second channel access scheme, the channel access scheme corresponding to the first transmission burst being the second channel access scheme;

when each of channel access schemes corresponding to the 2nd transmission burst to the (N−1)-th transmission burst within the first COT is a first channel access scheme, and a first time duration is smaller than or equal to a first threshold, the channel access scheme corresponding to the first transmission burst being the first channel access scheme; or when each of the channel access schemes corresponding to the 2nd transmission burst to the (N−1)-th transmission burst within the first COT is the first channel access scheme, and the first time duration is greater than the first threshold, the channel access scheme corresponding to the first transmission burst being the second channel access scheme;

the second case comprises at least one of:

when a channel access scheme corresponding to the second transmission burst is the second channel access scheme, the channel access scheme corresponding to the first transmission burst being the second channel access scheme;

when the first device receives second information on the second transmission burst before transmitting on the first transmission burst, and a first time duration is smaller than or equal to a first threshold, the channel access scheme corresponding to the first transmission burst being a first channel access scheme;

when the first device receives the second information on the second transmission burst before transmitting on the first transmission burst, and the first time duration is greater than the first threshold, the channel access scheme corresponding to the first transmission burst being the second channel access scheme; or when the first device does not receive the second information on the second transmission burst before transmitting on the first transmission burst, the channel access scheme corresponding to the first transmission burst being the second channel access scheme;

wherein the first time duration is a time duration between end time of the second transmission burst and start time of the first transmission burst;

wherein in the first channel access scheme, no channel sensing is required before transmitting on a transmission burst;

wherein in the second channel access scheme, one-slot channel sensing is required before transmitting on a transmission burst.

10. The method according to claim 9, wherein the second transmission burst is a transmission burst for the network device to perform downlink transmission; and the first time period comprises no downlink channel or downlink signal transmitted by the network device to the terminal device, and/or the first time period comprises no Synchronizing Signal Block (SSB), and/or Physical Downlink Control Channel (PDCCH) carrying common information, and/or Physical Downlink Shared Channel (PDSCH) carrying common information.

11. A communication device, comprising:
a processor; and
a memory,
wherein the memory is configured to store a computer program, and the processor is configured to invoke and run the computer program stored in the memory to perform the method according to claim 9.

12. The method according to claim 9, the terminal device does not expect to receive any signal in a first time period at an end of the second transmission burst.

13. A wireless communication method for an unlicensed frequency spectrum, comprising:
transmitting, by a network device, downlink information to a terminal device on a first transmission burst,
wherein the first transmission burst is a transmission burst within first Channel Occupancy Time (COT) obtained by the terminal device, a second transmission burst is a last transmission burst before the first transmission burst within the first COT, and a first time interval between end time of the second transmission burst and start time of the first transmission burst is shorter than or equal to a first threshold; and the first transmission burst is an N-th transmission burst within the first COT, and the second transmission burst is an (N−1)-th transmission burst within the first COT, N being a positive integer greater than 2, and the channel access scheme corresponding to the first transmission burst is determined based on a first case or a second case;

the first case comprises at least one of:

when a channel access scheme corresponding to at least one transmission burst from the 2nd transmission burst to the (N−1)-th transmission burst within the first COT is a second channel access scheme, the channel access scheme corresponding to the first transmission burst being the second channel access scheme;

when each of channel access schemes corresponding to the 2nd transmission burst to the (N−1)-th transmission burst within the first COT is a first channel access scheme, and a first time duration is smaller than or equal to a first threshold, the channel access scheme corresponding to the first transmission burst being the first channel access scheme; or when each of the channel access schemes corresponding to the 2nd transmission burst to the (N−1)-th transmission burst within the first COT is the first channel access scheme, and the first time duration is greater than the first threshold, the channel access scheme corresponding to the first transmission burst being the second channel access scheme;

the second case comprises at least one of:

when a channel access scheme corresponding to the second transmission burst is the second channel access scheme, the channel access scheme corresponding to the first transmission burst being the second channel access scheme;

when the first device receives second information on the second transmission burst before transmitting on the first transmission burst, and a first time duration is smaller than or equal to a first threshold, the channel access scheme corresponding to the first transmission burst being a first channel access scheme;

when the first device receives the second information on the second transmission burst before transmitting on the first transmission burst, and the first time duration is greater than the first threshold, the channel access scheme corresponding to the first transmission burst being the second channel access scheme; or when the first device does not receive the second information on the second transmission burst before transmitting on the first transmission burst, the channel access scheme corresponding to the first transmission burst being the second channel access scheme;

wherein the first time duration is a time duration between end time of the second transmission burst and start time of the first transmission burst;

wherein in the first channel access scheme, no channel sensing is required before transmitting on a transmission burst;

wherein in the second channel access scheme, one-slot channel sensing is required before transmitting on a transmission burst.

14. A communication device, comprising:
a processor; and
a memory,
wherein the memory is configured to store a computer program, and the processor is configured to invoke and run the computer program stored in the memory to perform the method according to claim 13.

15. The method according to claim 13, the network device does not expect to receive any signal in a first time period at an end of the second transmission burst.

* * * * *